(12) United States Patent
Beric et al.

(10) Patent No.: US 11,075,758 B2
(45) Date of Patent: Jul. 27, 2021

(54) ACCESS SECURITY SYSTEM AND METHOD

(71) Applicant: MASTERCARD INTERNATIONAL INCORPORATED, Purchase, NY (US)

(72) Inventors: John Beric, London (GB); James Noe, West Wickham (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 281 days.

(21) Appl. No.: 16/196,976

(22) Filed: Nov. 20, 2018

(65) Prior Publication Data

US 2019/0190717 A1 Jun. 20, 2019

(30) Foreign Application Priority Data

Dec. 19, 2017 (EP) .................................. 17208427

(51) Int. Cl.
*H04L 9/32* (2006.01)
*G06F 21/40* (2013.01)
(Continued)

(52) U.S. Cl.
CPC ............ *H04L 9/3228* (2013.01); *G06F 21/40* (2013.01); *G06Q 20/12* (2013.01); *G06Q 20/385* (2013.01); *G06Q 20/4012* (2013.01); *G06Q 20/40145* (2013.01); *H04L 9/3231* (2013.01); *H04L 9/3234* (2013.01); *H04L 63/0876* (2013.01);
(Continued)

(58) Field of Classification Search
CPC ........ H04L 9/3228; H04W 4/80; G06F 21/40; G06Q 20/12
See application file for complete search history.

(56) References Cited

U.S. PATENT DOCUMENTS 7,740,168 B2 * 6/2010 Hammad ........... G06Q 20/3823
235/379
8,640,213 B2 * 1/2014 Najafi ..................... G06F 21/34
726/7

(Continued)

OTHER PUBLICATIONS

Krivtsova, E., "International Search Report and Written Opinion of the International Searching Authority", International Application No. PCT/US2018/059978, dated Mar. 7, 2019, 9 pages.

(Continued)

*Primary Examiner* — Vance M Little

(57) ABSTRACT

The present disclosure relates to an access security system and method, for example for securing access to data, objects or locations. According to one aspect there is provided a computer-implemented access security method, the method comprising: receiving, at a processor, a first authentication credential from a near-field communication, 'NFC' reader; generating a one-time token, at the processor, in dependence on the first authentication credential, the one-time token being in a form which is capable of reproduction by a user; and outputting the one-time token via an interface for use as an authentication credential in an access procedure. Other aspects relate to a user device for implementing such a method, a computer program product for storing instructions which, when executed, cause such a method to be implemented, and a system in which such a method can be used.

20 Claims, 3 Drawing Sheets

(51) Int. Cl.
   *H04L 29/06*    (2006.01)
   *H04W 4/80*     (2018.01)
   *G06Q 20/12*    (2012.01)
   *G06Q 20/38*    (2012.01)
   *G06Q 20/40*    (2012.01)

(52) U.S. Cl.
   CPC .............. *H04L 63/10* (2013.01); *H04W 4/80* (2018.02); *H04L 2463/082* (2013.01)

(56) References Cited

U.S. PATENT DOCUMENTS

| | | | |
|---|---|---|---|
| 8,689,290 B2 | 4/2014 | Buer | |
| 8,832,807 B1* | 9/2014 | Kuo | H04L 9/3228 726/6 |
| 9,780,950 B1* | 10/2017 | Dundas | H04L 9/006 |
| 9,825,765 B2* | 11/2017 | Oberheide | H04L 9/3247 |
| 2002/0191786 A1* | 12/2002 | Marroquin | H04L 9/0662 380/42 |
| 2006/0242698 A1* | 10/2006 | Inskeep | G06Q 20/385 726/20 |
| 2008/0127321 A1* | 5/2008 | Vaeth | H04L 9/3234 726/9 |
| 2008/0137861 A1 | 6/2008 | Lindmo et al. | |
| 2009/0104888 A1 | 4/2009 | Cox | |
| 2012/0066749 A1 | 3/2012 | Taugbøl et al. | |
| 2013/0276078 A1* | 10/2013 | Rockwell | H04L 63/0846 726/7 |
| 2015/0067793 A1* | 3/2015 | Robison, Jr. | H04L 63/083 726/5 |
| 2015/0132984 A1* | 5/2015 | Kim | H04L 63/0838 439/345 |
| 2015/0189505 A1* | 7/2015 | Marien | H04W 12/06 380/270 |
| 2015/0206129 A1* | 7/2015 | Perez Lafuente | G06Q 20/326 705/44 |
| 2015/0348002 A1* | 12/2015 | Van Os | G06Q 20/3278 705/44 |

OTHER PUBLICATIONS

Aguilar, Jose Maria, "Communication", European Patent Application No. 17208427.9, dated Feb. 28, 2018, 7 pages.

Aguilar, Jose Maria, "Communication", European Patent Application No. 17 208 427.9, dated Jun. 23, 2020, 5 pages.

Nickitas-Etienne, Athina, International Preliminary Report of Patentability:, International Patent Application No. PCT/US2018/059978, dated Jul. 2, 2020, 7 pages.

* cited by examiner

ACCESS SECURITY SYSTEM AND METHOD

CROSS REFERENCE TO RELATED APPLICATION

This application claims priority to European Patent Application No. 17208427.9, filed Dec. 19, 2017, entitled "Access Security System and Method", the entirety of which is incorporated by reference.

FIELD OF THE INVENTION

The present disclosure relates to an access security system and method, for example for securing access to data, objects or locations.

More specifically, aspects relate to a computer-implemented access security method, a user device for implementing such a method, a computer program product for storing instructions which, when executed, cause such a method to be implemented, and a system in which such a method can be used.

BACKGROUND OF THE INVENTION

Authentication is a method of access control in which a user is granted access to something only after successfully presenting multiple separate pieces of evidence to an authentication mechanism. Typically the types of evidence fall into one of three categories: knowledge (something the user knows), possession (something the user has), and inherence (something the user is). Knowledge authentication credentials include passwords, passcodes, personal identification numbers (PINs), and secret question and answer combinations which are a shared secret between the user attempting to gain access and the authenticator. Possession authentication credentials include keys and devices which electronically store identifiers known to the authenticator. Inherence authentication credentials include biometrics such as DNA, fingerprints, palm/finger vein, iris and retinal patterns, heart rhythm, and facial recognition; and behaviour metrics such as typing rhythm, gait and speech recognition.

Depending on what access is being granted to and the user's familiarity with different authentication technologies, different authentication processes may be appropriate. What is needed therefore is an alternative authentication process.

SUMMARY

According to a first aspect, there is provided a computer-implemented access security method, the method comprising: receiving, at a processor, a first authentication credential from a near-field communication, 'NFC' reader; generating a one-time token, at the processor, in dependence on the first authentication credential, the one-time token being in a form which is capable of reproduction by a user; and outputting the one-time token via an interface for use as an authentication credential in an access procedure.

The method can further comprise: receiving a second authentication credential from a user interface device; and determining that the second authentication credential matches a pre-stored authentication credential; wherein the outputting of the one-time token is performed in response to the determining that the second authentication credential matches a pre-stored authentication credential.

The method can be performed by a user device, wherein the pre-stored authentication credential is pre-stored on the user device.

The second authentication credential can comprise: a knowledge authentication credential, such as a personal identification number, 'PIN', password or passcode; and/or an inherence authentication credential, such as a photograph of a user's face, a scan of their fingerprint, iris or retina, or a recording of their heartbeat or voice.

The method can further comprise, in response to receiving the first authentication credential, causing a user interface device to request at least part of the second authentication credential from the user.

At least part of the second authentication credential can be received prior to the first authentication credential as part of a log-in or unlock procedure, such as for a user device performing the method, an application running on such a user device or a web interface accessed by such a user device.

The one-time token can be a cryptogram.

The method can further comprise: receiving data relating to an object of the access procedure from a user interface device; and generating the one-time token further in dependence on the data relating to the object of the access procedure.

The method can further comprise generating the one-time token further in dependence on a further authentication credential stored on a user device performing the method, such as a user device identifier.

Outputting the one-time token for use as an authentication credential in an access procedure can comprise providing the one-time token to a user interface device for provision to a user.

An object of the access procedure can be a payment network, a securely stored data file, a securely stored object or a secure location.

According to a second aspect, there is provided a user device comprising: a processor; and a memory communicably coupled to the processor and storing instructions which, when executed by the processor, cause the user device to perform the method of the first aspect.

The user device can further comprise: the NFC reader; and a user interface device configured to act as the respective user interface devices referred to in variants of the first aspect.

According to a third aspect there is provided a computer program product comprising computer-executable instructions which, when executed by a processor, cause the method of the first aspect to be performed.

According to a fourth aspect there is provided a system comprising the user device of the second aspect, and an authentication server configured to: receive a request for access from a user device, the request comprising the one-time token; determine that the one-time token matches an expected value; and initiate provision of the requested access.

BRIEF DESCRIPTION OF THE FIGURES

Aspects of the present disclosure will now be described, by way of example only, with reference to the accompanying figures, in which.

DETAILED DESCRIPTION OF THE FIGURES

The following description is presented to enable any person skilled in the art to make and use the system, and is provided in the context of a particular application. Various modifications to the disclosed embodiments will be readily apparent to those skilled in the art.

Described herein is a computer-implemented authentication process making use of a possession authentication credential received from a near-field communication (NFC) reader. This is used to generate a one-time token, which is provided for use as an authentication credential in an access procedure.

Figure 1:
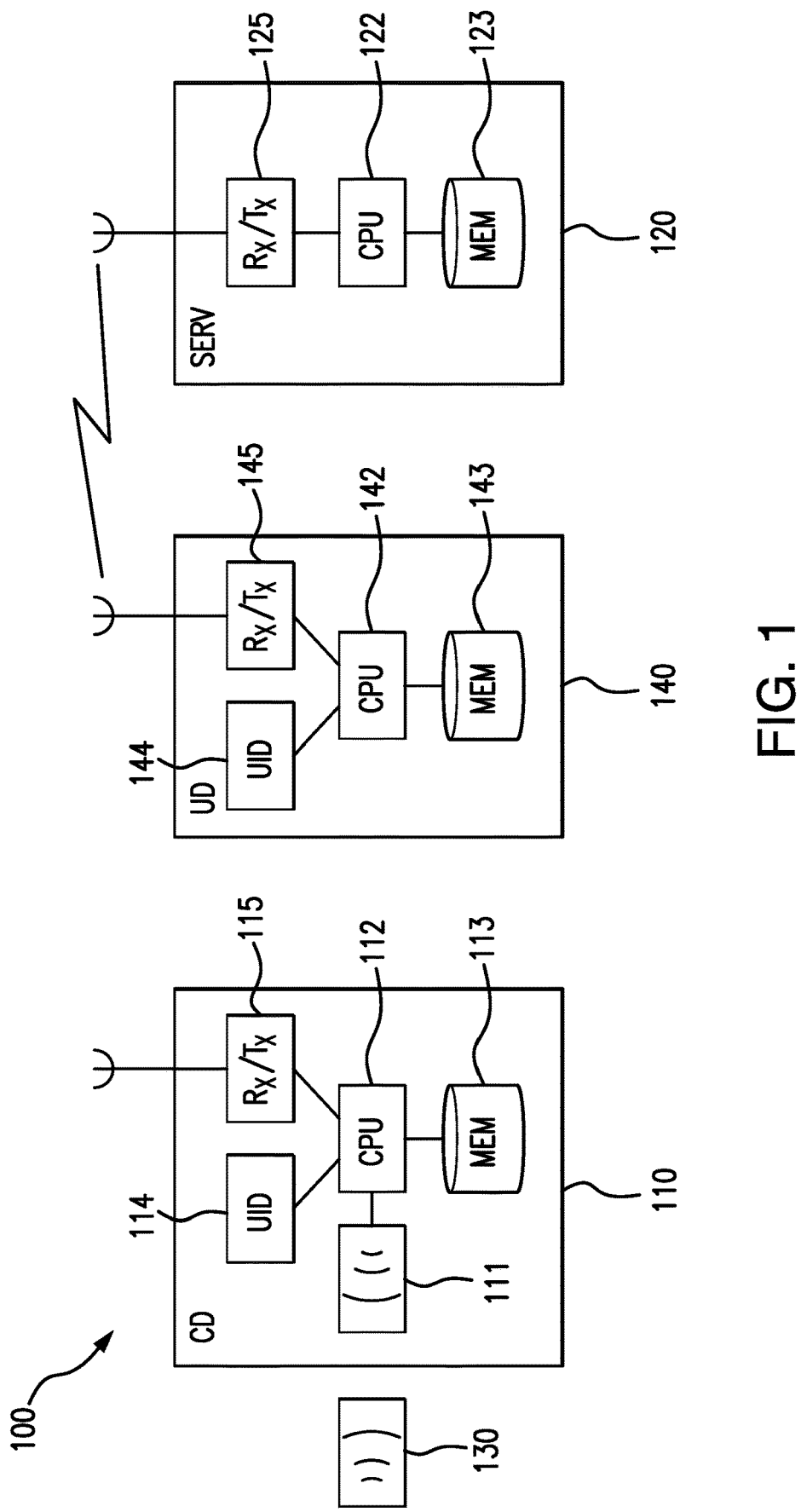
FIG. 1 illustrates an example access security system.

FIG. 1 illustrates a system 100 in which such an authentication process could be used. The process involves at least a computing device 110 and an authentication server 120.

In the example shown, the computing device 110 is a user device such as a smartphone, smartwatch, tablet, laptop or personal computer (PC). It could alternatively be another kind of computing device, for example a server, communicably coupled to one or more user devices which perform those functions described other than processing, data storage and communication. In any examples in which authentication credentials need to be communicated to the computing device 110 from a separate device, that communication should be secured, for example via encryption.

In this example, the computing device 110 comprises an NFC reader 111 communicably coupled to a processor 112, which is in turn communicably coupled to a memory 113 storing computer code for execution by the processor 112. In other examples, the NFC reader 111 could be comprised in a separate device communicably coupled to the computing device 110.

The processor 112 receives a first authentication credential from the NFC reader 111 when a user positions their NFC authentication tag 130 in range of the reader 111, for example by tapping the user device 110 with the tag 130. The NFC tag 130 may be a dedicated authentication tag, such as may be carried on a key-ring, or may be used for other purposes. For example, it could be a contactless payment card, e.g. for a credit or debit account, or a user device with contactless functionality, such as a smart wearable (e.g. smart watch).

The processor 112 then generates a one-time token from the first authentication credential. The token is a one-time token for additional security; if it is intercepted during transmission it will be of no use to a malicious third party wishing to use it fraudulently as it can only be used once. The one-time nature of the token could be achieved by generating it in dependence on the time it is generated, and/or some other unique identifier of the operation, using a one-way function such as a hash.

The one-time token is then provided to the authentication server 120. In this example, the one-time token is provided to the authentication server 120 using a user device 140. The one-time token is a cryptogram or other human-readable token. It can be provided to the user through the user interface device 114 or another user interface device (e.g. a screen or speaker), which in some examples could be the same user interface used to challenge the user as described above. The user could then provide the one-time token to the user device 140 using a user interface device 144, for example a touchscreen, keypad or microphone. The user device 140 could then forward the one-time token (which may or may not be modified by the user device 140) to the authentication server 120 using a communication module 145 under the control of a processor 142 acting according to instructions stored in a memory 143.

In other examples, the one-time token could be provided to the authentication server 120 via a network interface (as opposed to via a user's interaction with one or more user interfaces).

The authentication server 120 receives the one-time token at its own communication module 125, which is communicably coupled to its processor 122. The processor 122 then compares the received one-time token to an expected value, for example generated on-the-fly using data stored in a memory 123, also communicably coupled to the processor 122. If the received one-time token is as expected, the authentication server 120 initiates providing access to the user. In order to compare the received one-time token to an expected value, the authentication server must either store or have access to the first authentication credential, as well as the function used to generate the one-time token.

Optionally, for further increased security, multi-factor authentication (MFA) can be used. That is, the token could only be provided for use if a second authentication credential is determined to match a stored value. In this example, the processor 112 receives a second authentication credential through a user interface device 114.

The second authentication credential could be any of a possession, knowledge or inherence authentication credential. In the case of a knowledge authentication credential the user interface device 114 could for example be a touchscreen, keypad or microphone. In the case of an inherence authentication credential the user interface device 114 could for example be a fingerprint, iris or retina scanner, a microphone or a heart rate monitor.

In this example, the user interface device 114 is comprised in the computing device 110, but in other examples the user interface device 114 could be comprised in a separate device communicably coupled to the computing device 110.

The processor 112 compares the received second authentication credential with a pre-stored authentication credential. The pre-stored authentication credential could be stored in the memory 113, or in a separate device communicably coupled to the computing device 110.

Receipt of the first and second authentication credentials by the processor 112 can occur in either order but, in this MFA example, both are required before the token can be provided.

In one example, receipt of the first authentication credential from the NFC reader 111 triggers a challenge to the user via the user interface device 114, or another user interface device (e.g. a screen or speaker), to provide the second authentication credential. In that case, the user positioning the NFC tag 130 in range of the NFC reader 111 may initiate the entire authentication process. Alternatively, the user may be prompted to position the NFC tag 130 in range of the NFC reader 111 by a user interface device in response to the user initiating the authentication process, for example by opening an application, navigating to a web interface or navigating to an operating system function. As another alternative, such a prompt could come in response to a third party (for example the authenticator) initiating the authentication process through a transmission to the computing device 110.

In examples in which the second authentication credential is provided first, it could be provided as part of a log-in or unlock procedure, for example to unlock the computing device 110, log-in to a local application or log-in to an account through a web interface.

The processor 112 may generate the one-time token from the first authentication credential as soon as it is received from the NFC reader 111. Alternatively, if the second authentication credential has not yet been received at that point, generation of the one-time token could be (but does not necessarily have to be) delayed until the second authentication credential has been received.

The process described above is for two factor authentication, but one or more additional factors could be incorporated to increase security further.

As one example, the processor 112 could obtain data related to the desired access, for example via the user interface device 114 or another user interface device, and generate the one-time token in dependence on that data. Alternatively, if the user device 140 obtains such data it could modify the one-time token in dependence on it.

As another example, a further possession authentication credential could be introduced by generating the one-time token further in dependence on a value stored in the memory 113 of the computing device 110. For example, if the computing device 110 is a smartphone, the one-time token could be generated in dependence on the telephone number associated with its subscriber identity module (SIM) card, and/or its international mobile equipment identity (IMEI) and/or its international mobile subscriber identity (IMSI). Alternatively or additionally, the one-time token could be modified by the user device 140 in dependence on such a value stored in its own memory 143.

Figure 2:
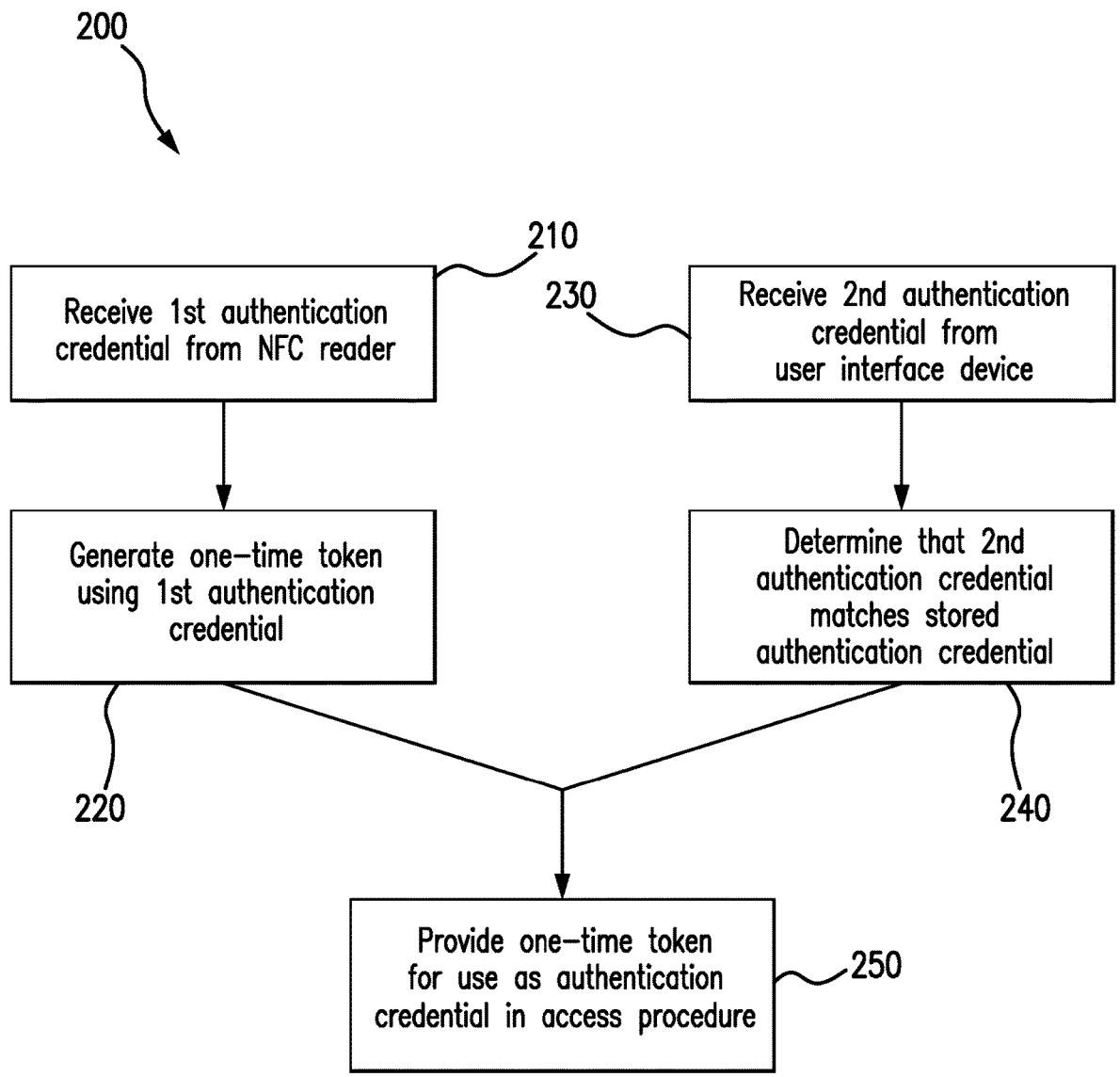
FIG. 2 is a flowchart outlining an example multi-factor authentication (MFA) method.

FIG. 2 is a flowchart outlining an example MFA method 200, such as may be performed by a computing device such as the computing device 110 of FIG. 1. At step 210 a first authentication credential is received from an NFC reader. At step 220 a one-time token is generated in dependence on the first authentication credential. At step 230 a second authentication credential is received from a user interface device. At step 240 the second authentication credential is determined to match a pre-stored authentication credential. At step 250 the one-time token is provided for use as an authentication credential in an access procedure.

Step 220 follows step 210. Step 240 follows step 230. Step 250 follows all the other steps. The two branches of the flowchart can occur one in series (in either order), or partially or fully in parallel.

Figure 3:
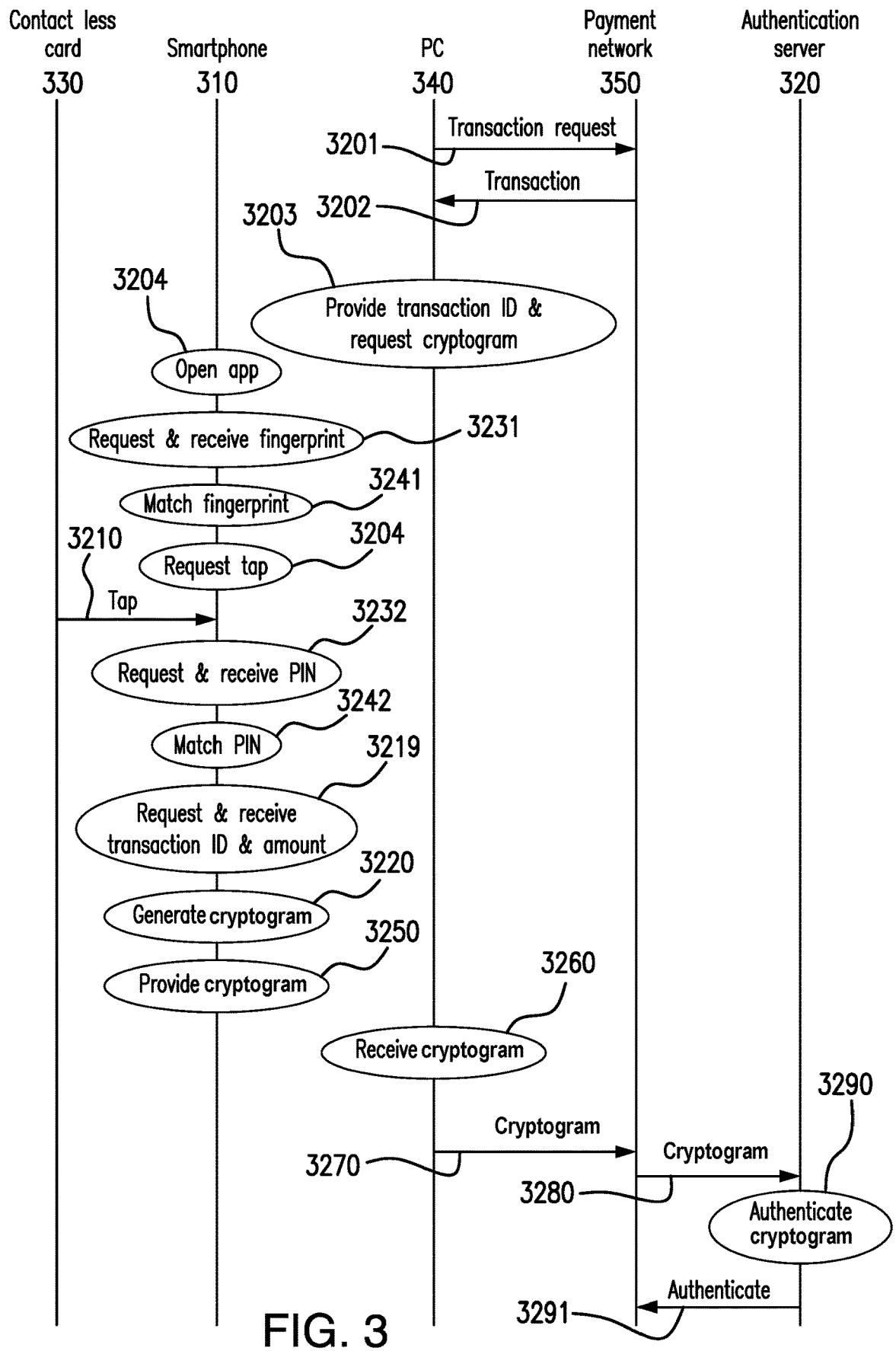
FIG. 3 illustrates another example MFA method.

FIG. 3 illustrates an example MFA method and system in which the concepts described above could be implemented. In this example, a user desires access to a payment network in order to make an e-commerce purchase. Before their transaction request can be processed to confirm that the payment account they are attempting to transfer funds from has sufficient funds to complete the transaction, their identity as an authorised user of that account must be authenticated.

In this example, the user wishes to make an e-commerce purchase from their PC 340. At step 3201 a transaction request is communicated from the PC 340 to a payment network 350. At step 3202 a transaction identifier (ID) is communicated from the payment network 350 to the PC 340. This causes the PC 340 to provide the user with the transaction ID and request a cryptogram from the user at step 3203, in order to authenticate them as an authorised user of the account the transaction has been requested from.

At step 3204 the user opens an authentication app on their smartphone 310. The login procedure for this app requires fingerprint authentication, so at step 3231 the smartphone 310 requests and received a scan of the user's fingerprint. This is matched to a fingerprint scan, stored in a previous registration procedure, at step 3241. With the login procedure completed, at step 3204 the smartphone 310 instructs the user to tap the contactless card 330 associated with the account the transaction has been requested from on the smartphone's NFC reader. This action is completed at step 3210.

Receiving NFC communication from the contactless card 330 at step 3210 causes the smartphone 310 to request and receive the associated PIN from the user at step 3232. At step 3242 the received PIN is matched by the smartphone 310 to one stored in a previous registration procedure. This triggers the smartphone 310 to request and receive the transaction ID and amount from the user at step 3219. At step 3220 the smartphone 310 then generates a cryptogram using data received via NFC from the contactless card 330, the transaction ID, the transaction amount and the smartphone's IMEI. This is provided to the user at step 3250 in a human-understandable format such as an alphanumeric code.

The user enters the cryptogram into the PC interface, where it is received at step 3260. The cryptogram is communicated from the PC 340 to the payment network 350 at step 3270, and then relayed to an authentication server 320 at step 3280. The authentication server 320 authenticates the cryptogram at step 3290 by comparing it to an expected value. At step 3291 an authentication message is communicated from the authentication server 320 to the payment network 350. The requested transaction can then proceed to be authorised (or not) by the payment network in the usual manner.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

User devices can include, without limitation, static user devices such as PCs and mobile user devices such as smartphones, tablets, laptops and smartwatches.

Receivers and transmitters as described herein may be standalone or may be comprised in transceivers. A communication link as described herein comprises at least one transmitter capable of transmitting data to at least one receiver over one or more wired or wireless communication channels. Such a communication link can optionally further comprise one or more relaying transceivers.

User input devices can include, without limitation, microphones, buttons, keypads, touchscreens, touchpads, trackballs, joysticks and mice. User output devices can include, without limitation, speakers, graphical user interfaces, indicator lights and refreshable braille displays. User interface devices can comprise one or more user input devices, one or more user output devices, or both.

The invention claimed is:

1. A computer-implemented access security method, the method comprising:
   receiving, at a processor, a first authentication credential from a near-field communication (NFC) reader;
   generating a one-time token, at the processor, in dependence on the first authentication credential, the one-time token being in a form which is capable of reproduction by a user;
   requesting, via a user interface device, at least part of a second authentication credential from the user in response to receiving the first authentication credential, wherein the second authentication credential is received from the user interface device;
   determining that the second authentication credential matches a pre-stored authentication credential; and
   outputting the one-time token via the user interface device, wherein the one-time token is utilized by the user as an authentication credential during an access procedure.

2. The method of claim 1, further comprising:
   receiving the first authentication credential from the NFC reader when the user positions an NFC authentication tag in range of the NFC reader.

3. The method of claim 1, performed by a user device, wherein the pre-stored authentication credential is pre-stored on the user device.

4. The method of claim 1, wherein the second authentication credential comprises at least one of: a knowledge authentication credential, including at least one of a personal identification number (PIN), password or passcode; and an inherence authentication credential, including at least one of a photograph of a user's face, a scan of their fingerprint, iris or retina, or a recording of their heartbeat or voice.

5. The method of claim 1, further comprising:
   providing the one-time token to an authentication server via a user device, wherein the authentication server determines whether the one-time token matches an expected value prior to initiating provision of requested access associated with the authentication process.

6. The method of claim 1, wherein at least part of the second authentication credential is received prior to the first authentication credential as part of a log-in or unlock procedure, including at least one of a user device performing the method, an application running on such a user device or a web interface accessed by such a user device.

7. The method of claim 1, wherein the one-time token is a cryptogram.

8. The method of claim 1, further comprising:
   receiving data relating to an object of the access procedure from the user interface device; and
   generating the one-time token further in dependence on the data relating to the object of the access procedure.

9. The method of claim 1, further comprising generating the one-time token further in dependence on a further authentication credential stored on a user device performing the method including a user device identifier.

10. The method of claim 1, wherein outputting the one-time token for use as an authentication credential in an access procedure comprises providing the one-time token to the user interface device for provision to the user.

11. The method of claim 1, wherein an object of the access procedure is a payment network, a securely stored data file, a securely stored object or a secure location.

12. A user device comprising:
    a processor; and
    a memory communicably coupled to the processor and storing instructions which, when executed by the processor, cause the user device to:
    receive a first authentication credential from an NFC reader;
    generate a one-time token, at the processor, in dependence on the first authentication credential, the one-time token being in a form which is capable of reproduction by a user;
    request at least part of a second authentication credential from the user in response to receiving the first authentication credential, wherein the second authentication credential is received from a user interface device;
    determine that the second authentication credential matches a pre-stored authentication credential; and
    output the one-time token via the user interface device, wherein the one-time token is utilized by the user as an authentication credential during an access procedure.

13. The user device of claim 12, further comprising:
    the NFC reader, wherein the first authentication credential is received from the NFC reader when the user positions an NFC authentication tag in range of the NFC reader.

14. The user device of claim 12, wherein, in response to receiving the first authentication credential, the user interface device is caused to request at least part of the second authentication credential from the user.

15. The user device of claim 12, wherein the memory and instructions, when executed by the processor, further cause the user device to:

receive data relating to an object of the access procedure from the user interface device; and generate the one-time token further in dependence on the data relating to the object of the access procedure.

16. The user device of claim 12, wherein outputting the one-time token for use as an authentication credential in an access procedure comprises providing the one-time token to the user interface device for provision to a user, and further comprising:

an authentication server, wherein the one-time token is provided to the authentication server via a user device, wherein the authentication server determines whether the one-time token matches an expected value prior to initiating provision of requested access associated with the authentication process.

17. A computer-readable storage medium comprising computer-executable instructions which, when executed by a processor, cause the processor to:

receive a first authentication credential from an NFC reader;

generate a one-time token, at the processor, in dependence on the first authentication credential, the one-time token being in a form which is capable of reproduction by a user;

request at least part of a second authentication credential from the user in response to receiving the first authentication credential;

receive the second authentication credential from a user interface device;

determine that the second authentication credential matches a pre-stored authentication credential; and output the one-time token via the user interface device, wherein the one-time token is utilized by the user as an authentication credential during an access procedure.

18. The computer-readable storage medium of claim 17, wherein the computer-executable instructions, when executed by a processor, further cause the processor to:

receive the first authentication credential from the NFC reader when the user positions an NFC authentication tag in range of the NFC reader.

19. The computer-readable storage medium of claim 18, wherein, in response to receiving the first authentication credential, the user interface device is caused to request at least part of the second authentication credential from the user.

20. The computer-readable storage medium of claim 17, wherein the computer-executable instructions, when executed by a processor, further cause the processor to:

receive data relating to an object of the access procedure from the user interface device; and generate the one-time token further in dependence on the data relating to the object of the access procedure.

* * * * *